(12) United States Patent
Oberhauser et al.

(10) Patent No.: US 9,810,554 B2
(45) Date of Patent: Nov. 7, 2017

(54) POSITION MEASURING INSTRUMENT

(71) Applicant: Dr. Johannes Heidenhain GmbH, Traunreut (DE)

(72) Inventors: Johann Oberhauser, Vachendorf (DE); Heinz Tovar, Siegsdorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 562 days.

(21) Appl. No.: 13/909,603

(22) Filed: Jun. 4, 2013

(65) Prior Publication Data

US 2013/0334409 A1 Dec. 19, 2013

(30) Foreign Application Priority Data

Jun. 13, 2012 (EP) .................................... 12171783

(51) Int. Cl.
G01D 5/347 (2006.01)
(52) U.S. Cl.
CPC ....... G01D 5/3473 (2013.01); G01D 5/34792 (2013.01)
(58) Field of Classification Search
CPC .. G01D 5/347; G01D 5/3473; G01D 5/34707; G01D 5/34746; G01D 5/34776; G01D 5/34784; G01D 5/34792; G01D 5/34715
USPC .... 250/231.13, 231.14, 231.17, 231.18, 233, 250/236; 356/614, 615, 617, 622; 340/555, 556, 557, 567, 686.1, 2.4
See application file for complete search history.

(56) References Cited

U.S. PATENT DOCUMENTS

| 5,279,044 | A | 1/1994 | Bremer |
| 7,013,575 | B2 | 3/2006 | Strasser et al. |
| 7,534,993 | B2 | 5/2009 | Strasser |
| 2004/0174792 | A1* | 9/2004 | Miyamoto ......... G11B 7/24082 369/59.25 |

(Continued)

FOREIGN PATENT DOCUMENTS

| DE | 10 2006 010 161 A1 | 8/2007 |
| DE | 10 2008 053 977 A1 | 5/2010 |

(Continued)

*Primary Examiner* — Francis M Legasse, Jr.
*Assistant Examiner* — Don Williams
(74) *Attorney, Agent, or Firm* — Brinks Gilson & Lione

(57) ABSTRACT

A position measuring instrument including a code carrier having first and second code tracks, each including an identical series of code elements, wherein each of the series of code elements has two subregions with complementary properties. A scanning unit having detectors for scanning code elements, wherein each of the code elements defines one corresponding code word, wherein each of the code words defines an absolute position in the measuring direction, and wherein the detectors form a corresponding scanning signal from each of the two subregions of the series of code elements. An evaluation unit generating one item of code information for each of the series of code elements from each corresponding scanning signal, and forming the corresponding code words from the one item of code information, wherein each of the code words is composed of N and K items of code information from successive code elements of the first and second code tracks, respectively, with N and K being greater than 1.

13 Claims, 3 Drawing Sheets

(56) References Cited

U.S. PATENT DOCUMENTS

2009/0079996 A1* 3/2009 Mayer et al. ................. 356/617
2011/0218761 A1* 9/2011 Lingk .......................... 702/151

FOREIGN PATENT DOCUMENTS

| EP | 0 503 716 A1 | 9/1992 |
| EP | 1 468 254 B1 | 7/2005 |
| EP | 1 770 375 A1 | 4/2007 |

\* cited by examiner

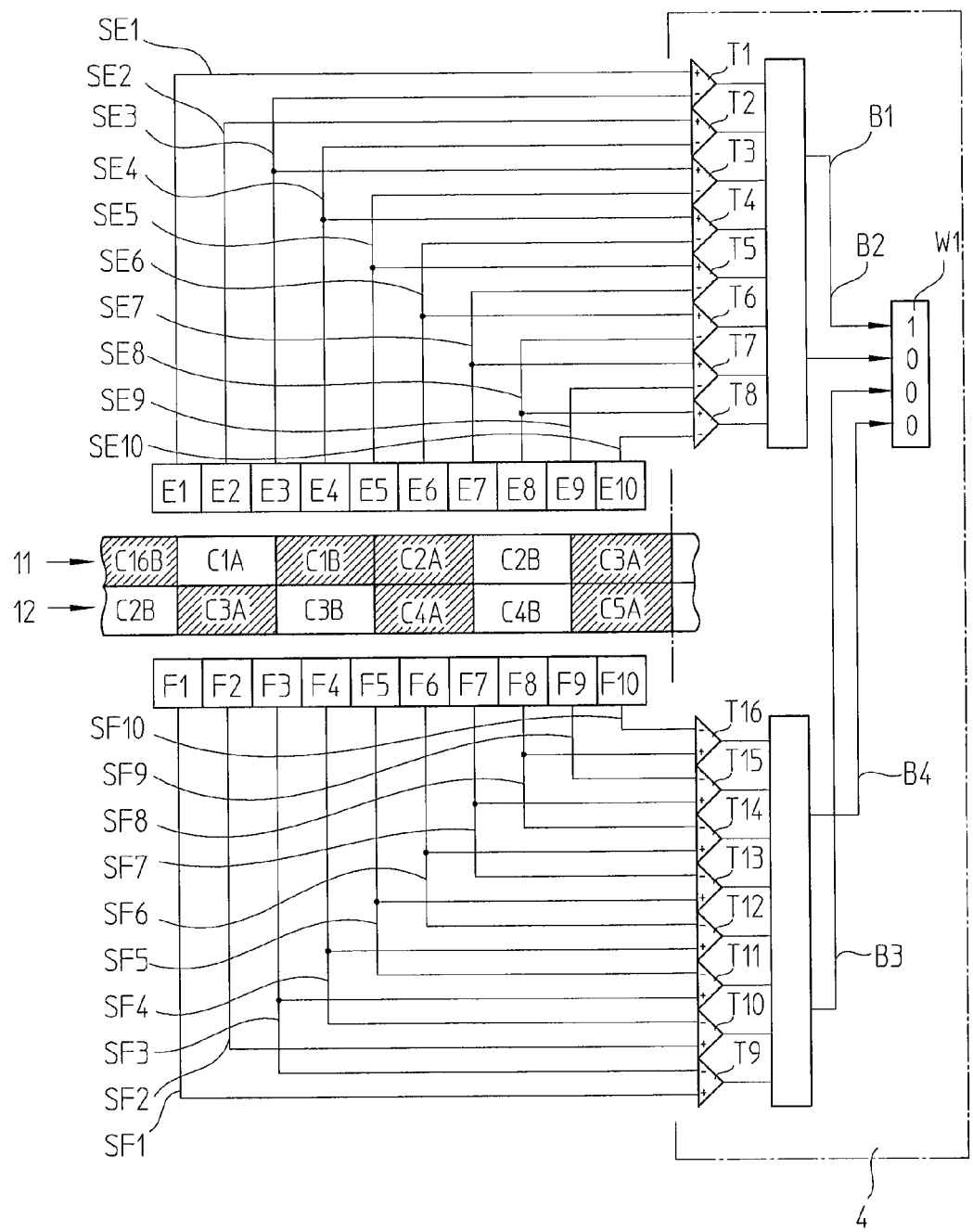

POSITION MEASURING INSTRUMENT

RELATED APPLICATIONS

Applicants claim, under 35 U.S.C. §119, the benefit of priority of the filing date of Jun. 13, 2012 of a European patent application, copy attached, Serial Number 12 171 783.9, filed on the aforementioned date, the entire contents of which is incorporated herein by reference.

BACKGROUND

1. Technical Field

The present invention relates to a position measuring instrument for determining an absolute position.

2. Background Information

Absolute position measuring instruments in which absolute position information is derived from a code track having code elements disposed in succession in a measuring direction are being used increasingly in many fields. The code elements are provided in a pseudo-random distribution, so that a defined number of successive code elements each form one bit pattern. Upon displacement of the scanning unit relative to the code track by a single code element, a new bit pattern is already formed, and over the entire measurement range that is to be detected in absolute form, a series of different bit patterns is available.

One such sequential code is known as a chain code or pseudo-random code (PRC).

A position measuring instrument with a pseudo-random code is explained in German patent disclosure DE 10 2006 010 161 A1, for example. A plurality of code tracks extending parallel to one another are provided, each of which has the same series of code elements. By scanning one of these code tracks, the absolute position in one measuring direction is determined, and by scanning a further code track, the absolute position in a second direction perpendicular to the first direction is determined.

An absolute position measuring instrument that is a point of departure for the present invention is described in European patent disclosure EP 1 468 254 B1. The position measuring instrument has a code which includes a series of code elements in succession in the measuring direction, and each code element in turn has two subregions, which are complementary to one another and are disposed in succession in the measuring direction. This code is scanned by a scanning unit that has a plurality of detectors. In an evaluation unit, a comparison output signal is formed from the scanning signals from the subregions of one code element, and a check is made as to whether the comparison output signal is above or below a reference value, and as a function of that, a bit "0" or "1" is derived as code information for the corresponding code element.

OBJECTS AND SUMMARY OF THE INVENTION

An object of the present invention is to create an absolute position measuring instrument which makes a compact structure possible and with which a correct absolute position can be generated highly reliably.

This object is attained by a position measuring instrument including:

a code carrier having a series of code elements, each code element including two subregions with associated complementary properties, which are disposed in succession in a measuring direction X;

a scanning unit having a plurality of detectors for scanning code elements, each defining one code word, and for forming at least one scanning signal within each of the subregions of the code elements;

an evaluation unit embodied for generating one item of code information for each of the code elements from the scanning signals and for forming the code word from the items of code information, and the code elements are disposed in a first code track and in a second code track extending parallel to it, each code track having the same series of code elements, and the code word is composed of N items of code information from successive code elements in the first code track and K items of code information from successive code elements in the second code track, with N and K greater than 1.

The two subregions of one code element are disposed in succession in the measuring direction X, and each has the same width in the measuring direction.

The embodiment of the code elements is selected in a known manner as a function of the scanning principle. For instance, the code elements can be designed to be scannable optically, magnetically, capacitively, or inductively. The detectors are selected in accordance with how the code elements are embodied.

A first embodiment of the present invention is that the series of code elements of the second code track, relative to the series of code elements of the first code track, is displaced in the measuring direction X on the code carrier such that the code elements forming the code word of the first code track and of the second code track overlap one another at least partially.

It is advantageous if the displacement V=N/2+K/2 code elements. This ensures that the code elements of one track that form the code word maximally overlap the code elements of the other track that form the code word. Because of this provision, the optical scanning principle can be especially advantageously used. Specifically, the code tracks can be illuminated by the same scanning beam, which originates in a lighting unit. For the optical scanning, the two subregions of one code element have optical properties complementary to one another. In particular, the two subregions are opaque and transparent for transmitted-light scanning, or reflective and nonreflective for incident-light scanning. Because the same code sequences in a plurality of code tracks are displaced relative to one another, homogenous lighting of the code elements to be scanned in the plurality of code tracks can be done using the same scanning beam.

In a second embodiment of the present invention, the second code track is used not only for deriving scanning signals from further code elements, but also for generating redundant scanning signals, which are also obtained by scanning the first code track. To that end, at least one code element of the succession in the second code track is assigned a detector for forming a redundant scanning signal, with which in the first code track as well, a detector for forming a scanning signal is associated.

It is advantageous if the evaluation unit includes comparators, to each of which two scanning signals are delivered from detectors which have the same spacing in the measuring direction X as two subregions disposed in succession in the measuring direction X. In addition, the comparators are each embodied for generating the code information by comparison of the delivered scanning signals.

It is especially advantageous if a plurality of detectors are disposed within one subregion of a code element. As a result, it is ensured that from at least one of these detectors, an unambiguous scanning signal for that subregion can be generated, and, thus, a secure item of code information can be derived from it.

An advantageous and simple structure is obtained if the detectors are disposed in the measuring direction X at spacings corresponding to half the length of one subregion.

Further advantages and details of the present invention will become apparent from the ensuing description of exemplary embodiments in conjunction with the drawings.

BRIEF DESCRIPTION OF THE DRAWINGS

FIG. 3 shows an excerpt from the code of the position measuring instrument of FIG. 1, with details of an embodiment of an evaluation unit in accordance with the present invention.

DETAILED DESCRIPTION OF THE PREFERRED EMBODIMENTS

The absolute position measuring instrument of the present invention can be used to measure linear or rotary motions, with one code carrier 1 mounted on one of the objects to be measured, and a scanning unit 2 mounted on the other of the objects to be measured. The objects to be measured may be a table and a carriage of a machine tool or a coordinate measuring machine, or the rotor and stator of an electric motor.

The present invention is advantageous for measuring rotary motions, which is why the present invention is described in further detail below in terms of an angle measuring instrument.

Figure 1:
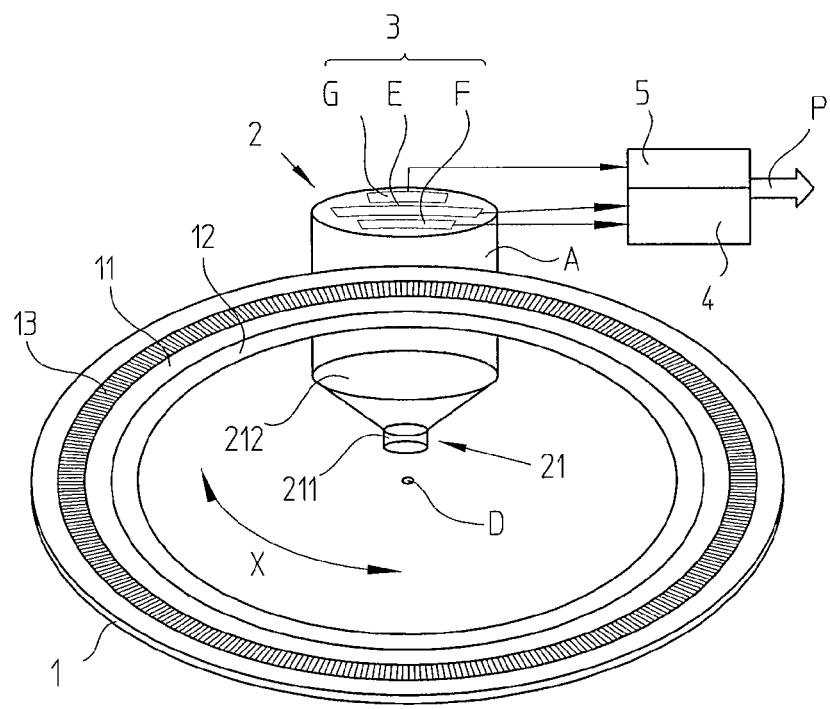
FIG. 1 schematically shows an embodiment of a position measuring instrument in accordance with the present invention.

FIG. 1 shows this position measuring instrument schematically. It includes the code carrier 1, which can be scanned by the scanning unit 2. For measuring rotary motions of the code carrier 1 relative to the scanning unit 2, the code carrier 1 is supported rotatably in the measuring direction X about an axis of rotation D.

Figure 2:
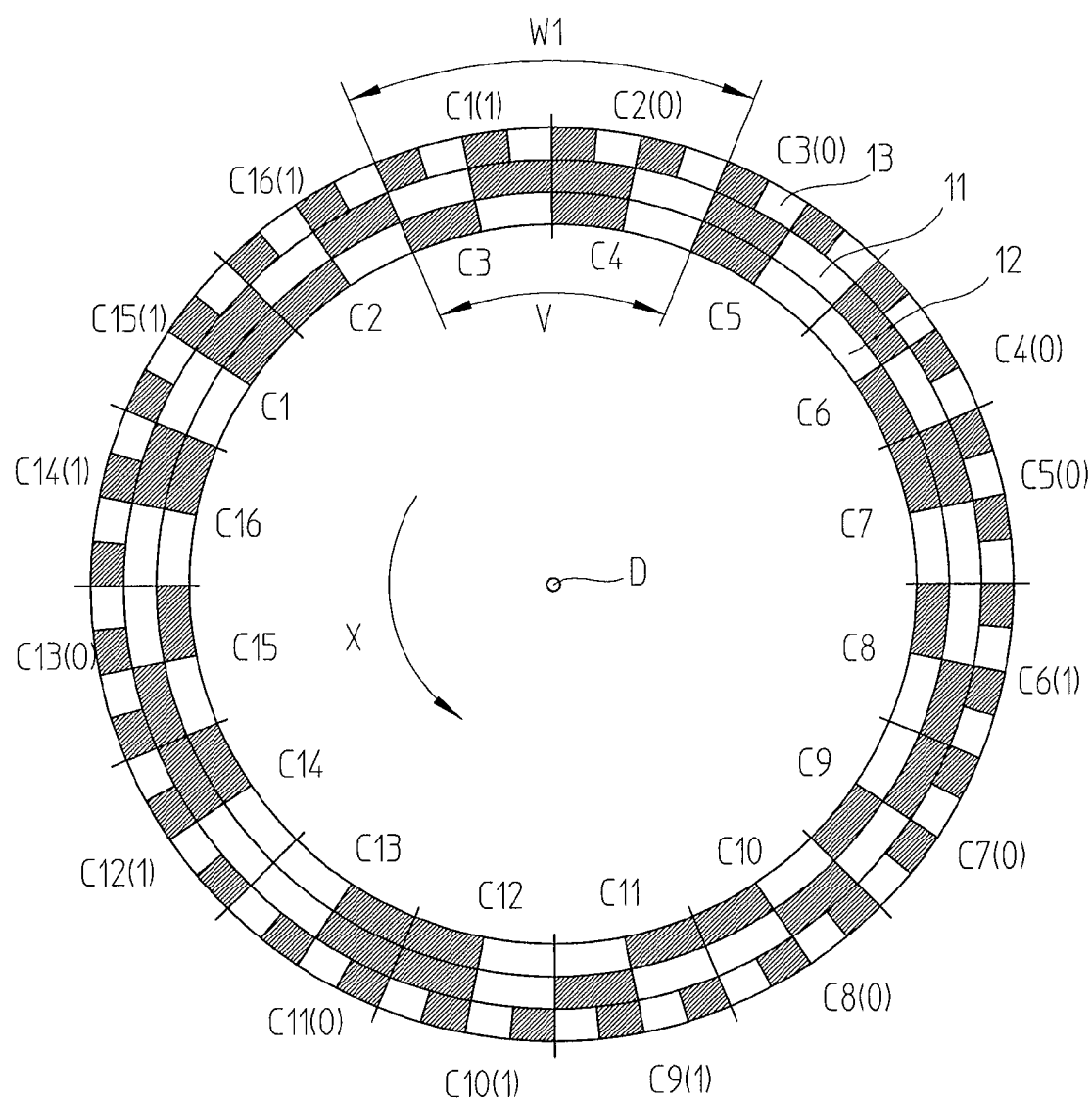
FIG. 2 shows an embodiment of a code carrier of the position measuring instrument of FIG. 1 in accordance with the present invention.

The code carrier 1 has at least two code tracks 11, 12, extending parallel to one another and in circular-annular form, whose embodiment will be explained in further detail hereinafter in conjunction with FIG. 2. In the example shown, a periodic incremental track 13 is provided on the code carrier 1 as well.

In the example of the scanning unit 2, the code tracks 11, 12 and the incremental track 13 are scanned photoelectrically. To that end, the scanning unit 2 includes a lighting unit 21, which has a light source 211 and an optical element 212. The lighting unit 21 forms a scanning beam A for scanning the two code tracks 11, 12 and the incremental track 13 jointly. The scanning beam A is modulated as a function of position of the code tracks 11, 12 and the incremental track 13 so that modulated beams of light reach a detector unit 3, shown only schematically in FIG. 1.

The detector unit 3 has detectors E for scanning the first code track 11 and detectors F for scanning the second code track 12. The scanning signals from these detectors E, F are delivered to an evaluation unit 4. The evaluation unit 4 forms from the scanning signals from detectors E and F and within one revolution of the code carrier 1, an unambiguous absolute position in the form of a code word W.

Parallel to and alongside the code tracks 11, 12, there is an incremental track 13 with a periodic graduation. The incremental track 13 is scanned in a known manner by at least two detectors G, offset from one another in the measuring direction X by ½ of one graduation period of the incremental track 13, for generating analog scanning signals phase-shifted by 90° from one another. These analog scanning signals are interpolated in a known manner in a unit 5, and the interpolated position value generated by unit 5 is combined with the code word W. From such combination, the coarse absolute position measurement is made finer by a high-resolution interpolation, and a total absolute value P is made available. This total absolute value P is preferably made available to a downstream electronic unit via a serial interface.

The position measuring instrument is designed to be able to detect as many different absolute positions as possible within a measurement distance. On the other hand, the position measurement instrument is also designed such that reliable position measurement is ensured.

Reliable position measurement is achieved by using special coding. This coding of the code carrier 1 is shown in detail in FIG. 2. The first code track 11 has a pseudo-random code. The code track 11 includes a series, disposed successively in the measuring direction X, of code elements C1 through C16 of equal length. In turn, each code element C1 through C16 includes two subregions C1A, C1B through C16A, C16B of equal length, disposed immediately succeeding one another in the measuring direction X, which are embodied as complementary to one another. "Complementary" means that they have inverse properties; that is, in the optical scanning principle, they are transparent and non-transparent, or in incident-light scanning they are reflective and nonreflective.

In the example shown, it is assumed that the dark→bright series of subregions A, B of one code element C1 through C16 defines the code information in the form of a bit=0, and the bright→dark series defines the code information in the form of a bit=1. Thus, the series of code elements C1 through C16 of the first code track 11 defines the code information 1000010011010111. This series of the items of code information of the first code track 11 is indicated in FIG. 2 on the outer code track 11, and the resultant code information is appended in parentheses for each code element C1 through C16.

Obtaining the highest possible number of different absolute positions requires the simultaneous scanning of as many code elements C1 through C16 as possible. In the present invention, this task is performed by providing that the same series of code elements C1 through C16 is also present in at least the second code track 12 of the code carrier 1. The series of code elements C1 through C16 of the second code track 12 is displaced relative to the series of code elements C1 through C16 of the first code track 11. For example, if from the first code track 11 two code elements C are used for obtaining a multi-digit code word, then the series of code elements C of the second code track 12 is displaced by two code elements C relative to the first code track 11, as shown by the series of items of code information of the second code track 12 that are indicated on the inner circumference in FIG. 2. The code word, which defines the absolute position unambiguously, is composed according to the present invention of N items of code information from successive code elements C of the first code track 11 and K items of code information from successive code elements C of the second code track 12, with N and K each being greater than 1.

The succession of code elements C of the second code track 12 on the code carrier 1 is displaced relative to the succession of code elements C of the first code track 11 by a plurality of code elements C in the measuring direction X. This displacement V of the series of code elements C is effected in the direction of the location where the N items of code information are obtained from the first code track 11. As a result of this displacement of the series of code elements C, it is possible for all the items of code information required to be obtained from one scanning region, which is illuminated uniformly by the same lighting unit 21. Thus, the length of the scanning beam A transversely to the measuring direction X is also utilized. Optimal utilization can be attained if the displacement V=N/2+K/2 code elements C.

The detector unit 3 thus, has first detector elements E for scanning the first code track 11 and second detector elements F for scanning the second code track 12. Because of the displacement V in the measuring direction X explained above, the first detector elements E and the second detector elements F overlap one another, and they are disposed side-by-side perpendicular to the measuring direction X, or, in other words, in the radial direction, as can be seen from FIGS. 1 and 3.

In conjunction with FIG. 3, it will now be explained in further detail how sixteen code words W1 through W16 are unambiguously distinguishable from one another. Accordingly, 16 absolute positions can be reliably obtained by scanning the two code tracks 11, 12 over 360° of the code carrier 1. It is assumed that the code carrier 1 is rotating counterclockwise relative to the scanning unit 2.

W1: 1000
W2: 0000
W3: 0001
W4: 0010
W5: 0100
W6: 1001
W7: 0011
W8: 0110
W9: 1101
W10: 1010
W11: 0101
W12: 1011
W13: 0111
W14: 1111
W15: 1110
W16: 1100

The further explanation is done at the first scanning position, at which the code word W1 is generated. This momentary position is shown in FIG. 3.

The detector elements E and F are formed as a line sensor with detector elements E1 through E10 and F1 through F10 arranged serially in the measuring direction X. In the example, each code word W is to be obtained with four bits. This requires that at least one detector element E and F, respectively, is assigned to each subregion CA, CB of the four code elements C to be scanned, so that the detector unit 3 can derive one unambiguous scanning signal S from each subregion CA, CB. These scanning signals S are delivered to the evaluation unit 4 of FIG. 1, which is designed for comparing the two scanning signals SE1 and SE3; SE2 and SE4; SE3 and SE5; SE4 and SE6; SE5 and SE7; SE6 and SE8; SE7 and SE9; SE8 and SE10; and for comparing SF1 with SF3; SF2 with SF4; SF3 with SF5; SF4 with SF6; SF5 with SF7; SF6 with SF8; SF7 with SF9; and SF8 with SF10 of the two subregions CA, CB of one code element C1 through C16, and by this comparison, for each code element C1 through C16, to generate one item of code information in the form of a binary value or bit B1 through B16. A series of a plurality of items of code information B1 through B16 yields the code words W1 through W16, each of which defines one respective absolute position. Upon a displacement of the detector unit 3 relative to the code carrier 1 by the width or length of one code element C1 through C16, a new code word W1 through W16 is generated, and over the measurement region that is to be measured in absolute fashion, many different code words W1 through W16 are formed. In the example, over a revolution of 360°, sixteen different code words W1 through W16 are formed. Each of the scanning signals S, derived from the detectors E and F disposed in the measuring direction X at a mutual center spacing corresponding to the width of one subregion A, B of the code elements C, are compared with one another.

FIG. 3 shows a momentary position of the code carrier 1 relative to the scanning unit 2. The detector elements E1 through E10 and F1 through F10 are each successively disposed at a spacing of half the width of one subregion CA, CB. This ensures that in every position of the code tracks 11, 12, at least one detector element E1 through E10 and F1 through F10 is unambiguously associated with a particular subregion CA, CB and does not scan a transitional zone between two subregions CA, CB. In the position shown in FIG. 3, the subregion C1A is being scanned by the detector element E2, and the subregion C1B is being scanned by the detector element E4. The detector elements E2, E4 detect the light distribution, and as a function of the light intensity, they generate analog scanning signals SE2, SE4 that are proportional to the light intensity. Since the two subregions C1A and C1B are embodied as complementary to one another, the intensity of the scanning signals SE2 and SE4 is also inversely proportional to one another; that is, the signal levels are spaced far apart from one another.

This spacing of the signal levels is now utilized for generating the binary information B1, by checking which of the two scanning signals SE2, SE4 of the code element C1 is greater. This checking can be done by division or by subtraction. In the example shown in FIG. 3, subtraction is employed, wherein a trigger component serves as the comparator T2. The comparator T2 generates B1=0 as the code information if SE2 is less than SE4 and B1=1 information B2, B3 and B4 in the form of binary items of information are obtained by scanning the code elements C2, C3 and C4 and comparing the analog scanning signals SE6 with SE8; SF2 with SF4; and SF6 with SF8 of the subregions C2A, C2B; C3A, C3B; C4A, C4B of respective code elements C2, C3, C4, by comparators T6, T10, T14.

Thus, a first series of subregions A, B that are embodied as complementary to one another are assigned a first binary value, and a second series of subregions A, B that are embodied as complementary to one another are assigned a second binary value. In the example, the series of opaque-→transparent is assigned the value 0, and the series of transparent→opaque is assigned the value 1.

Since the two subregions A and B of each code element C1, C2, C3, C4 are complementary to one another, the signal-to-noise ratio of the scanning signals S is very high. In addition, any change in the light intensity of the light source 211 affects the scanning signals S of both subregions A and B equally.

Because of the complementary embodiment of each two subregions A, B of a code element C1, C2, C3, C4, scanning these subregions A, B must, if the position measuring instrument is operating correctly, generate respective analog scanning signals S, wherein the difference between the scanning signals of the subregion exceeds a predetermined differential value. By observation of this differential value, good error checking is made possible. The basis of this error checking is that it can be assumed that if the differential value is undershot by a predetermined amount, the binary information B1, B2, B3, B4 is uncertain, and an error signal is generated for that binary information B1, B2, B3, B4.

Which of the scanning signals S and thus which of the comparators T1 through T16, in which relative position between the code carrier 1 and the scanning unit 2, is used for forming the code word W can be derived in a known manner from the incremental track 13 or from the scanning signals S from the code tracks 11, 12 themselves. For this, see for instance EP 1 468 254 B1.

A further embodiment of the present invention will now be described in further detail.

In the position measuring instrument of EP 1 468 254 B1, which is the point of departure for the present invention, it can be seen that the output signals of detectors are split, so that one scanning signal can be delivered to each of two comparators. This principle is also adopted in the present invention. From FIG. 3, it can be seen that the scanning signals SE3 through SE8 of the detectors E3 through E8 are each split, so that the scanning signals SE3 through SE8 can each be delivered to two of the comparators T1 through T8. Since it is especially advantageous to evaluate currents as scanning signals S, in practice a current mirror is used for splitting each of the scanning signals S. From one scanning signal, a current mirror forms a copy of that scanning signal. However, current mirrors are relatively expensive to produce, and require a relatively large amount of space in a semiconductor substrate.

With the arrangement of the present invention, it is now possible to reduce the number of current mirrors required. This is done by making use of the fact that besides the series of code elements C1 through C16 in the first code track 11, the same series of code elements C1 through C16 is also present in the second code track 12. It is thus possible to avoid splitting the scanning signals SE9 and SE10 of the detectors E9 and E10. The detector E9 now generates the same scanning signal SE9 as the detector F1, and the detector E10 generates the same scanning signal SE10 as the detector F2. By the redundant generation of identical scanning signals SE9 and SF1 as well as SE10 and SF2, namely from the first code track 11 on the one hand and in addition from the second code track 12, splitting by a current mirror is made unnecessary. It is true that economizing by dispensing with one current mirror is achieved at the cost of at least one additional detector, but the detector can often be implemented more simply and in a more space-saving way.

In this embodiment of the present invention, at least one code element C3 of the series in the second code track 12 is assigned a detector F2 for forming a redundant scanning signal SF2, with which a detector E10 in the first code track 11 is also associated, for forming a scanning signal SE10. The redundant scanning signals SE10, SF2 obtained from the first code track 11 and the second code track 12 are delivered to the evaluation unit 4 of FIG. 1, in order to compare the redundant scanning signal SE10, derived from the first code track 11, with a scanning signal SE8 of the first code track 11, and to compare the redundant scanning signal SF2, derived from the second code track 12, with a scanning signal SF4 of the second code track 12. Thus, the redundant scanning signal SE10 derived from the first code track 11 is compared with a scanning signal SE8 of the first code track 11 that is obtained from a detector E8, which is offset by the length of one subregion C1A, C16A-C1B, C16B. For the comparator T8, the scanning signal SE8 is the clock signal, and the scanning signal SE10 is the push-pull signal. The redundant scanning signal SF2 derived from the second code track 12 is compared with a scanning signal SF4 of the second code track 12 that is obtained from a detector F4, which is offset by the length of one subregion C1A, C16A-C1B, C16B. For the comparator T10, the scanning signal SF2 that is redundant with regard to the scanning signal SE10 is now the clock signal, and the scanning signal SF4 is the push-pull signal.

Figure 4:
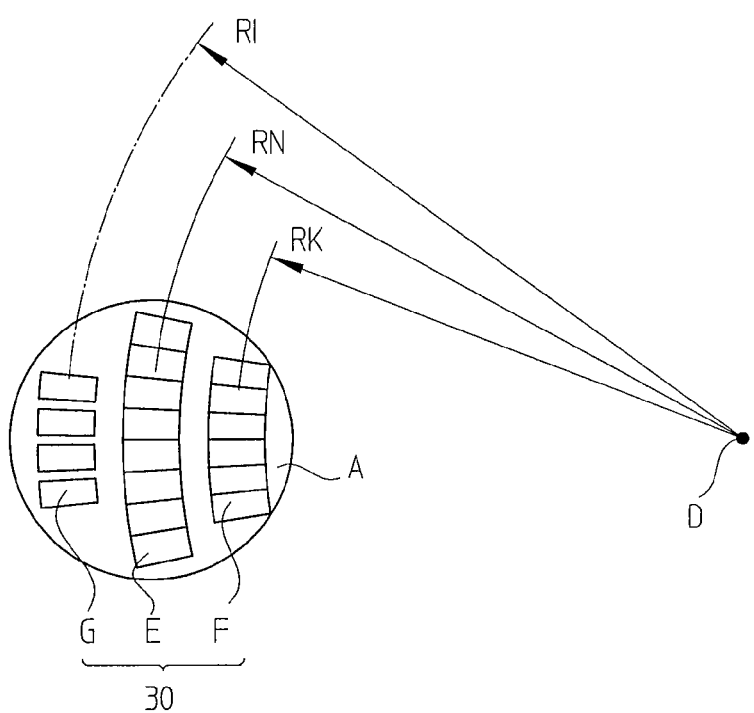
FIG. 4 shows a second embodiment of detectors to be used with the position measuring instrument of FIG. 1 for scanning a code carrier in accordance with the present invention.

FIG. 4 shows a further embodiment of a detector unit 30 for scanning one incremental track and two code tracks. Again, it is assumed that the incremental track to be scanned is disposed on a radius RI which has a magnitude that is greater than the magnitudes of the radius RN and the radius RK of the two code tracks. Disposing the incremental track on the outer circumference has the advantage that the highest possible number of graduation periods can be disposed over the circumference. For generating a 7-bit code word, the detector unit 30, for instance, has a first row of detectors E and a second row of detectors F. The detectors E are in turn assigned to a first code track and the detectors F to a second code track of a code carrier. For utilizing the uniform scanning beam A, more bits are generated with the first row of detectors E than with the second row of detectors F. In the example, the detectors E serve to generate 4 bits, and the detectors F serve to generate 3 bits.

The foregoing description is provided to illustrate the present invention, and is not to be construed as a limitation. Numerous additions, substitutions and other changes can be made to the invention without departing from its scope as set forth in the appended claims.

We claim:

1. A position measuring instrument, comprising:
   a code carrier comprising:
      a first code track comprising a first series of consecutive and uninterrupted code elements, wherein each of said consecutive and uninterrupted code elements of said first series of code elements consists essentially of two subregions with associated complementary properties, which are disposed in succession in a measuring direction; and
      a second code track extending parallel to said first code track and comprising a second series of code elements that is identical to said first series of consecutive and uninterrupted code elements, wherein said first series of consecutive and uninterrupted code elements and said second series of code elements each define identical code information, wherein said second series of code elements of said second code track is displaced, relative to said first series of consecutive and uninterrupted code elements of said first code track, in said measuring direction on said code carrier in such a way that said consecutive and uninterrupted code elements of said first code track and said code elements of said second code track that form a code word overlap one another at least partially, and wherein said second series of code elements of said second code track are displaced by an amount $V=N/2+K/2$ code elements relative to said first series of consecutive and uninterrupted code elements of said first code track;

a scanning unit comprising a plurality of detectors for scanning code elements of said first code track and said second code track, wherein said plurality of detectors form a corresponding scanning signal from each of said two subregions of said scanned code elements; and an evaluation unit comprising a structure for generating one item of code information in the form of a Bit from said corresponding scanning signal formed from each of said two subregions of each of said scanned code elements, and for forming said code word from said Bits which defines an absolute position in said measuring direction, wherein said code word is composed of N Bits from successive code elements of said first code track and K Bits from successive code elements of said second code track, with N and K being greater than 1.

2. The position measuring instrument according to claim 1, wherein said two subregions have optical properties that are complementary to one another, and that said first code track and said second code track are illuminated by a common scanning beam.

3. The position measuring instrument according to claim 1, wherein said evaluation unit comprises a comparator to which two of said scanning signals are delivered from a set of said detectors that have a spacing with respect to one another in said measuring direction X that is identical to a spacing of two of said subregions that are disposed in succession in said measuring direction X, and wherein said comparator has a structure for generating said N Bits and K Bits by comparison of said two delivered scanning signals.

4. The position measuring instrument according to claim 1, wherein at least one code element of said first series of consecutive and uninterrupted code elements in said first code track is assigned a first detector for forming a first scanning signal, and wherein at least one code element of said second series of code elements in said second code track is assigned a second detector for forming a second signal that is redundant of said first scanning signal.

5. The position measuring instrument according to claim 4, wherein said first signal and said second signal are delivered to said evaluation unit, wherein said evaluation unit compares said first signal with a scanning signal of said first code track, and compares said second scanning signal with a scanning signal of said second code track.

6. The position measuring instrument according to claim 1, wherein said detectors are disposed in said measuring direction X at spacings corresponding to half a length of one of said subregions.

7. The position measuring instrument according to claim 1, further comprising an incremental track that is disposed parallel to first code track and said second code track.

8. The position measuring instrument according to claim 7, wherein K is less than N, and said incremental track is disposed on a radius RI emanating from a center point, said first code track is disposed on a radius RN emanating from said center point, and said second code track is disposed on a radius RK emanating from said center point, with RI>RN>RK.

9. The position measuring instrument according to claim 1, wherein said first code track and said second code track are disposed in circular-annular fashion, and a sector width of each of said consecutive and uninterrupted code elements of said first series of code elements of said first code track is identical to a sector width of each of said code elements of said second series of code elements of said second code track.

10. The position measuring instrument according to claim 9, further comprising an incremental track that is disposed parallel to first code track and said second code track.

11. The position measuring instrument according to claim 10, wherein K is less than N, and said incremental track is disposed on a radius RI emanating from a center point, said first code track is disposed on a radius RN emanating from said center point, and said second code track is disposed on a radius RK emanating from said center point, with RI>RN>RK.

12. The position measuring instrument according to claim 1, wherein said consecutive and uninterrupted code elements of said first series of code elements have a circular annular form.

13. The position measuring instrument according to claim 12, wherein said consecutive and uninterrupted code elements of said first series of code elements has a first pattern that is identical to a second pattern of said code elements of said second series of code elements and wherein said first pattern is displaced relative to said second pattern.

* * * * *